United States Patent [19]
Bauernfeind et al.

[11] 3,715,433
[45] Feb. 6, 1973

[54] GROWTH PROMOTION IN SWINE

[75] Inventors: Jacob Christopher Bauernfeind, Upper Montclair; Milan Mitrovic, Nutley, both of N.J.

[73] Assignee: Hoffmann-La Roche Inc., Nutley, N.J.

[22] Filed: June 2, 1969

[21] Appl. No.: 829,763

[52] U.S. Cl. ............... 424/229, 424/228, 424/251, 424/273
[51] Int. Cl. ............................................. A61k 27/00
[58] Field of Search ..................... 424/229, 251, 273

[56] References Cited

FOREIGN PATENTS OR APPLICATIONS 1,119,636    7/1968    Great Britain

*Primary Examiner*—Sam Rosen
*Attorney*—Samuel L. Welt, Jon S. Saxe, Bernard S. Leon, Gerald S. Rosen and R. Hain Swope

[57] ABSTRACT

Compositions and methods for promoting the growth and increasing the feed efficiency of swine, comprising orally administering to the swine a composition comprising either (a) 1-methyl-2-isopropyl-5-nitroimidazole, (b) sulfa compound potentiated with a 2,4 - diamino - 5 - [2',4',5' - trisubstituted - benzyl] pyrimidine or (c) a mixture of (a) and (b). The method comprises feeding the swine a ration containing a sufficient amount of (a), (b) or (c) to achieve the desired effect, e.g., from about 10 grams to about 250 grams per ton, i.e., about 0.0011 part to about 0.0275 part per 100 parts by weight of feed.

4 Claims, No Drawings

3,715,433

GROWTH PROMOTION IN SWINE

SUMMARY OF THE INVENTION

This invention relates to compositions and methods for enhancing the growth and increasing the feed efficiency of swine. More particularly, this invention relates to the use of either (a) 1-methyl-2-isopropyl-5-nitroimidazole, (b) a sulfa compound potentiated with a 2,4-diamino-5-[2',4',5'-trisubstituted-benzyl]pyrimidine or (c) a mixture of (a) and (b) to promote growth and increase feed efficiency of swine. Further, this invention relates to feed compositions, premixes and concentrates containing as the active ingredient thereof, either (a) 1-methyl-2-isopropyl-5-nitroimidazole, (b) a sulfa compound potentiated with a 2,4-diamino-5-[2',4',5'-trisubstituted-benzyl]pyrimidine or (c) a mixture of (a) and (b).

DETAILED DESCRIPTION OF THE INVENTION

It has been found that the growth rate and feed efficiency of swine is improved by orally administering to the animals, in combination with their feed, sufficient amounts of either (a) 1-methyl-2-isopropyl-5-nitroimidazole, (b) a sulfa compound potentiated with a 2,4-diamino-5-[2',4',5'-trisubstituted-benzyl]pyrimidine or (c) a mixture of (a) and (b) to achieve the desired effect.

The compositions of this invention can be prepared by mixing the active ingredient, either directly, or as part of a concentrate or premix, into a conventional swine feed. It has been found that if the active ingredient is combined with the feed in proportions of from about 10 grams to about 250 grams per ton of feed, i.e., about 0.0011 part to about 0.0275 part active ingredient per part of feed, the desired growth promotion and feed efficiency occurs. If less than 10 grams per ton of feed is utilized, then no significant activity occurs and if more than 250 grams per ton is utilized, then no increase in effect or efficiency is apparent.

The preferred amount of active ingredient combined with the swine feed, according to this invention, is from about 50 grams to about 150 grams per ton of feed, i.e., about 0.0055 part to about 0.0165 part per 100 parts by weight of feed. These amounts are preferred because the affect per gram of active ingredient is greatest, however, as already discussed, lesser or greater amounts are effective.

It is generally most desirable to combine sufficient amount of the active ingredient with the ration to provide about 3 mg. per pound of body weight per day in the feed of young pigs and about 1.5 mg. per pound of body weight per day in pigs ready for market. These figures represent the average amounts of medicament ingested with feed by the animals when the feed contains about 100 gms. of the medicament per ton. These amounts can, of course, be varied depending on the size and condition of the animals.

Usually, for growth promotant effects in swine, the active compounds are included in the feed beginning with weaning until the age and weight suitable for marketing is reached.

1-Methyl-2-isopropyl-5-nitroimidazole, one of the active ingredients, is prepared by nitrating 2-isopropylimidazole to give 2-isopropyl-4(or 5)-nitroimidazole. The nitration is suitably carried out by adding a nitrating agent, e.g., a mixture of nitric and sulfuric acids, to the 2-isopropylimidazole starting material. The reaction is conveniently carried out at temperatures in the range of about 0°C. to 100°C. though higher or lower temperatures can also be employed.

The 2-isopropyl-4(or 5)-nitroimidazole obtained by the above-described nitration procedure can be readily alkylated by the usual alkylation techniques such as, for example, by treating with dimethylsulfate in an inert solvent, preferably at an elevated temperature, to form the desired 1-methyl-2-isopropyl-5-nitroimidazole.

The most preferred potentiated sulfa composition which is suitable for use in this invention is a composition comprising sulfadimethoxine and from about 0.01 to about 20 parts by weight of 2,4-diamino-5-(2'-methyl-4',5'-dimethoxybenzyl)pyrimidine per part by weight of sulfadimethoxine. Preferred is the composition comprising about five parts by weight of sulfadimethoxine per each part by weight of 2,4-diamino-5-(2'-methyl-4',5'-dimethoxybenzyl)pyrimidine.

Other sulfa compounds, e.g., sulfamethazine, sulfamethoxazole, sulformethoxine and the like, are suitable; however, sulfadimethoxine is preferred. Other potentiators can also be used, e.g., 2,4-diamino-5-(2',4',5'-<1/4-trimethoxybenzyl)pyrimidine, 2,4-diamino-5-(2'-ethyl-4',5'-dimethoxybenzyl)pyrimidine and the like.

The most suitable compositions containing both the potentiated sulfa composition and the 5-nitroimidazole for use in this invention is comprised of from about 0.5 to about 2 parts by weight of 1-methyl-2-isopropyl-5-nitroimidazole per part by weight potentiated sulfa composition. The preferred composition contains essentially equal parts by weight of the potentiated sulfa composition and 1-methyl-2-isopropyl-5-nitroimidazole.

The compositions of this invention can be suitably formed by (1) adding the active compounds directly to conventional swine feed by mixing, for example, in a vertical feed mixer; (2) forming a concentrate or premix of the active ingredients by mixing it with a suitable non-toxic edible carrier, e.g., corn meal, corn distillers dried grains, soybean meal, soya grits, soy flour, wheat middlings, farina, rice grits, malt sprouts, limestone, oyster shell meal, oyster shell flour, rice bran, crimped oats, oatmeal, brewers grains, salt, calcium silicate, clay, dicalcium phosphate, talc, fish meal, dried fish solubles, meat scraps, tankage, bone meal, dried whey, dried milk solids, antibiotic mycelia, fermentation solubles, distillers solubles, molasses solubles, dried yeast, dried citrus meal, etc.; then adding the premix or concentrate to the feed, either in a feed mixer or a feed blender.

The concentration of the active ingredients in the premix or concentrate can range from about 6 to about 75 percent by weight. Generally, a sufficient amount of active ingredient is present so that the addition of from 50 lbs. to 400 lbs. of concentrate to the amount of feed required to total 2,000 lbs. will provide the desired dosage. Convenient premixes contain, for example, either about 12½ percent by weight of 1-methyl-2-isopropyl-5-nitroimidazole, or about 30 percent by weight of the potentiated sulfa composition.

The following examples illustrate the invention.

EXAMPLE 1

1-Methyl-2-isopropyl-5-nitroimidazole premix for animal use

| | Grams/kilo |
|---|---|
| 1-Methyl-2-isopropyl-5-nitro imidazole | 125 |
| Pulverized oyster shell flour | 825 |
| Microcel E (calcium silicate) | 50 |
| Total Weight | 1000 grams |

Procedure:

1. The oyster shell flour was placed in a suitable mixer and, while mixing, the Microcel E was slowly added and thoroughly mixed.
2. While mixing continuously, the 1-methyl-2-isopropyl-5-nitroimidazole was slowly added and mixed until the mixture was homogeneous.
3. This premix can then be added to commercial swine feeds in sufficient amounts to provide 10 grams, 25 grams, 50 grams, 100 grams, 200 grams and 250 grams per ton, respectively, of the active compound.

EXAMPLE 2

The effect of 1-methyl-2-isopropyl-5-nitroimidazole upon the growth and feed efficiency of swine was determined as follows:

Pigs, just past weaning, were allotted to 15 pens at random by sex and weight. The pigs were individually weighed initially and at 2-week intervals for 6 weeks. Feed consumed per pen was recorded on weigh days.

The pigs were divided into five groups of 18 each, one group as control, four groups receiving respectively 25 grams, 50 grams, 100 grams and 200 grams of active compound per ton of feed.

The results of the experiments are set forth in Table I.

TABLE I

| % By weight of active drug in feed | Weight gain % of control | mortality % | Feed Efficiency lbs. feed/lbs. gain |
|---|---|---|---|
| 0 | 100 | 0 | 2.53 |
| 0.00275 | 114 | 0 | 2.34 |
| 0.0055 | 115 | 0 | 2.33 |
| 0.0110 | 112 | 0 | 2.44 |
| 0.0220 | 117 | 0 | 2.44 |

EXAMPLE 3

Premix containing a potentiated sulfa, for animal use

| Ingredient | % by weight |
|---|---|
| Sulfadimethoxine | 25 |
| 2,4-Diamino-5-(2'-methyl-4',5'-dimethoxybenzyl)pyrimidine | 5 |
| Dicalcium phosphate trihydrate | 70 |

Procedure:

1. The ingredients were placed in a suitable mixer and mixed until homogeneous.
2. The premix can then be added to commercial swine feed in sufficient amounts to provide 10 grams, 25 grams, 50 grams, 100 grams, 200 grams and 250 grams per ton, respectively, of the active composition.

EXAMPLE 4

The effect of the potentiated sulfa composition, a mixture of the potentiated sulfa composition with 1-methyl-2-isopropyl-5-nitroimidazole, and the latter administered alone upon the growth and feed efficiency of swine was determined as follows:

Pigs were allotted to 8 pens at random by weight and sex. The pigs at the start of the test were 13 weeks old and averaged 41.8 kg. in weight. The pigs were fed basal rations ad libitum. The drugs were added to the basal ration in a vertical feed mixer.

Pigs were weighed at intervals through the experiment, and feed consumed in each pen was recorded on weigh days.

A summary of the results in in Table II.

TABLE II

| Ingredient | % by wt. in feed | wt. gain % of control | mortality % | feed efficiency kg feed/ kg gain |
|---|---|---|---|---|
| a. 1-Methyl-2-isopropyl-5-nitroimidazole | 0.011 | 113 | 0 | 3.80 |
| b. Sulfadimethoxine (5 parts)+2,4-diamino-5-(2'-methyl-4',5'-dimethoxybenzyl) pyrimidine (1 part) | 0.011 | 113 | 0 | 3.75 |
| c. Mixture of (a) and (b) equal parts by weight | 0.011 | 110 | 0 | 3.82 |
| Control | ----- | 100 | 0 | 4.00 |

We claim:

1. A composition for promoting growth and increasing feed efficiency of swine comprising (1) a swine feed and (2) an effective amount of a mixture of ingredients, (a) 1-methyl-2-isopropyl-5-nitroimidazole with (b) a sulfa compound selected from the group consisting of sulfadimethoxine, sulfamethazine, sulfamethoxazole and sulformethoxine and (c) a 2,4-diamino-5-(2',4',5'-trisubstituted-benzyl)pryimidine wherein the trisubstituted benzyl is a radical selected from the group consisting of (2'-methyl-4',5',-dimethoxybenzyl), 2',4',5',-trimethoxybenzyl) and (2'-ethyl-4',5'-dimethoxybenzyl).

2. The composition of claim 1 wherein said mixture of ingredients is present in the feed in an amount of from about 0.0011 to about 0.0275 part per 100 parts by weight of a swine feed.

3. The composition of claim 1 which comprises a mixture of ingredients (a) 1-methyl-2-isopropyl-5-nitroimidazole, (b) sulfadimethoxine and (c) 2,4-diamino-5-(2'-methyl-4',5'-dimethoxybenzyl) pyrimidine wherein ingredient (a) is present in the composition in the proportion of 0.5 to 2 parts by weight to 1 part by weight of a mixture of ingredients (b) and (c) and ingredient (b) is present in the proportion of 5 parts by weight to 1 part by weight of ingredient (c).

4. A method of promoting growth and increasing feed efficiency in swine which comprises administering orally to swine an effective amount of the composition of claim 1.

* * * * *